Figure 1:
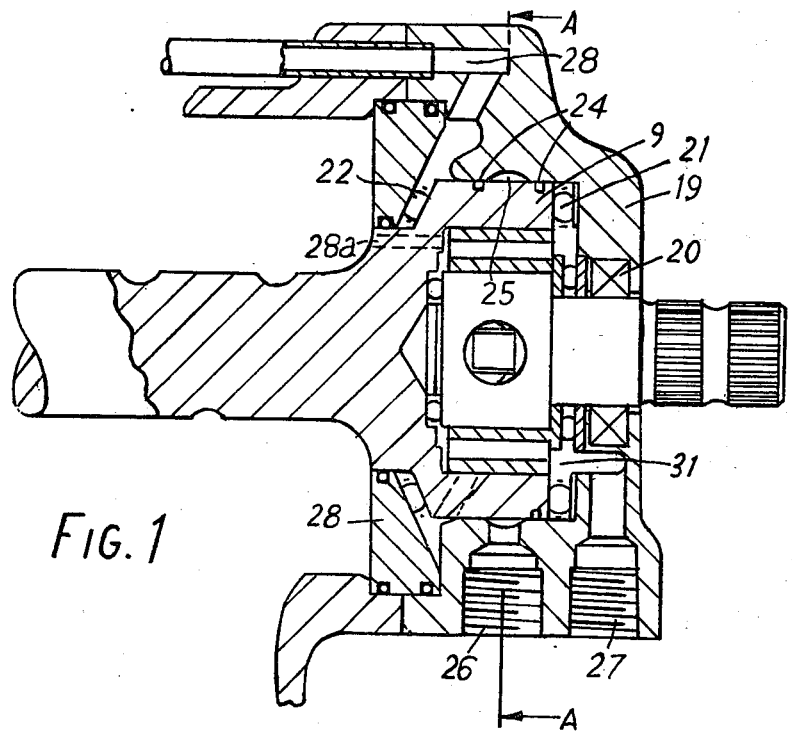

United States Patent [19]

Taig

[11] 4,057,079
[45] Nov. 8, 1977

[54] POWER ASSISTANCE CONTROL DEVICE
[75] Inventor: Alistair Gordon Taig, Bristol, England
[73] Assignee: Bendix-Westinghouse Limited, Bristol, England
[21] Appl. No.: 666,836
[22] Filed: Mar. 15, 1976
[30] Foreign Application Priority Data
 Apr. 15, 1975 United Kingdom ............... 15332/75
[51] Int. Cl.² ............................................. F15B 9/08
[52] U.S. Cl. ............................. 137/625.23; 91/375 R
[58] Field of Search ......................... 91/375 A, 375 R; 137/625.24, 625.21, 625.22, 625.23

[56] References Cited
U.S. PATENT DOCUMENTS
3,867,870  2/1975  Shimoura ........................... 91/375 A Primary Examiner—Alan Cohan
Attorney, Agent, or Firm—Ken C. Decker; William N. Antonis; Paul David Schoenle

[57] ABSTRACT

A fluid power assistance control device includes a rotatable input, a first valve coupled to the input and a second valve. The second valve is rotatable relative to the first valve and a projection between the first and second valves limits the rotation therebetween. The projection cooperates with the valve to substantially define fluid paths which communicate with an outlet and also defines flow restrictions within the paths such that rotation between the valves increases flow restriction in one of the fluid paths and decreases flow restriction in another of the fluid paths. The valves cooperate to define reaction cavities which communicate with respective fluid paths so that fluid communicated to one of the reaction cavities opposes the rotation of the input.

7 Claims, 6 Drawing Figures

POWER ASSISTANCE CONTROL DEVICE

This invention relates to a power assistance control device and relates especially to power assistance control valve apparatus for a vehicle steering mechanism.

In the specification of United Kingdom Pat. No. 1,431,437, there is described several embodiments of a hydraulic power assistance control device for providing power assistance for an effort exerted by a control part, the device having a fluid input port and a fluid output port, a fluid flow divider for dividing fluid flow from the input port between two parallel fluid flow paths, the flow divider being such as to provide flow restriction in said path and including means whereby an increase of fluid pressure downstream thereof in one path relative to that in the other path is accompanied by an increase restriction in the latter path the device also including valve means having a first valve member displaceable by the control part relative to the further valve member in either of two directions from an intermediate position, and a respective pressure output port connected to each said path between the flow divider and the valve means, the valve members being so shaped as to on the one hand provide between them variable restrictions in each said path such that a said movement is effective to increase one restriction and on the other hand to provide between them respective cavities in the flow paths, the fluid pressures acting within the cavities to produce reactions between the members which are transmissible to and counteracted by the control part.

By virtue of these said fluid pressures acting within the cavities to produce reaction between the valve members, one attribute of the device is that when the invention is applied to vehicle steering mechanisms, the said reactions can provide the vehicle driver with suitable appreciable degrees of feel on the vehicle steering wheel indicative of castering forces.

The main embodiments of the invention described in the said specification of the said U.K. Patent No. 1,431,432 each provide a flow divider which is to a certain extent free to take up a position which is determined by fluid flows and pressures in order to achieve the desired result and it is thought that in some applications this contributes at least in part to instabilities which may occur in the device, it being understood that the device is essentially a complex hydro-dynamic device.

According to the present invention there is provided a fluid power assistance control device including a force input member and a first valve member coupled thereto to be displaceable thereby relative to a second valve member, the valve members being so shaped one in relation to the other as on the one hand to provide in each of two fluid flow paths, fluid flow restrictions upstream and downstream of a fluid pressure output port and the relative displacement between the members tending to increase one said restriction and decrease the other, the shaping on the other hand providing reaction cavities between the valve members to produce reactions between the members which are counteracted by the input member, increase of the downstream restriction being accompanied by an increased fluid pressure at the respective output port.

By virtue of the present invention, the need for an at least partially free moving flow divider is dispensed with since the flow divider is now provided by the respective restrictions which are upstream of the output port these restrictions being also provided by relative configurations of the valve members themselves.

Figure 2:
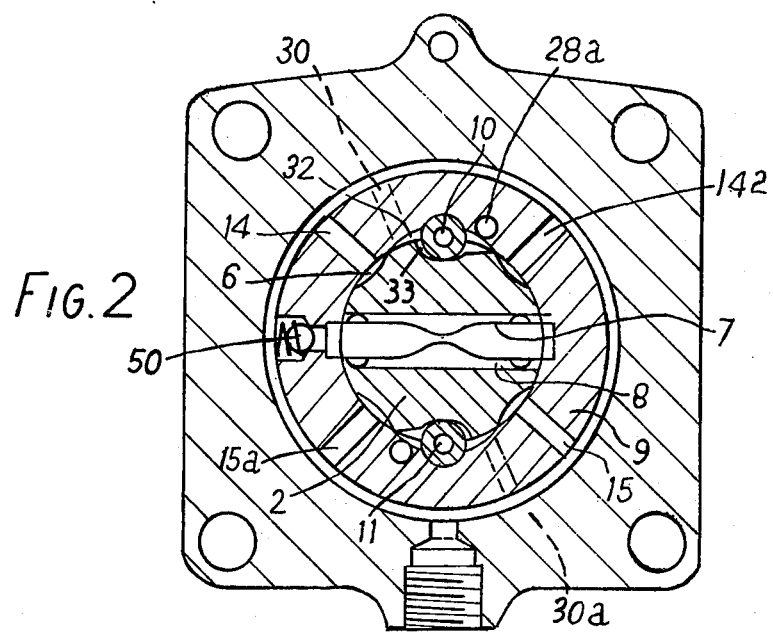

In order that the invention may be more clearly understood and readily carried into effect, the same will be further described by way of example, with reference to the accompanying drawings of which, FIG. 1 and FIG. 2 illustrate sectional views of an hydraulic power assistance control device suitable for use in conjunction with a power-assisted recirculating ball type of vehicle steering mechanism.

Figure 3:
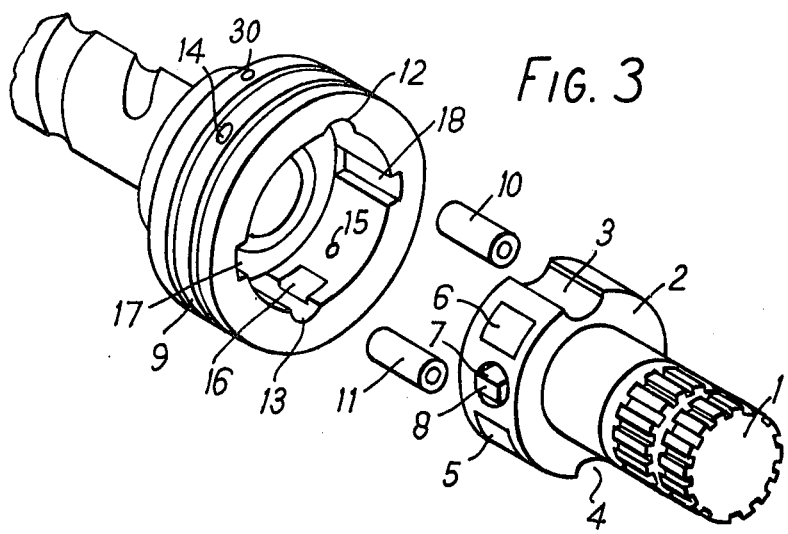
Figures 4A, 4B:
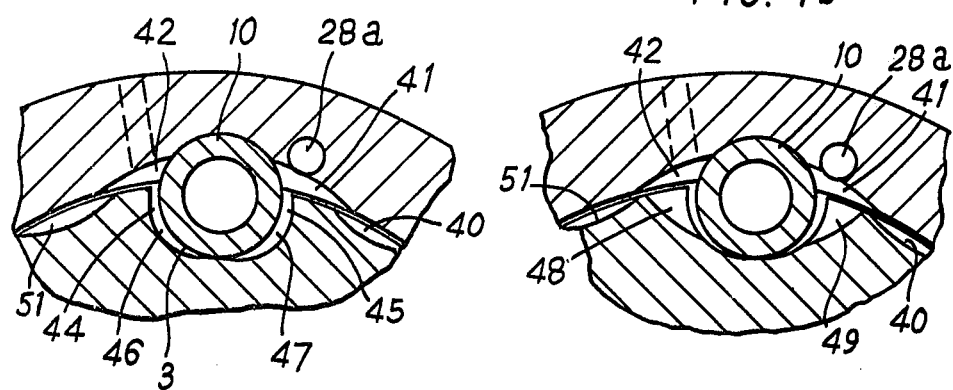
Figure 5:
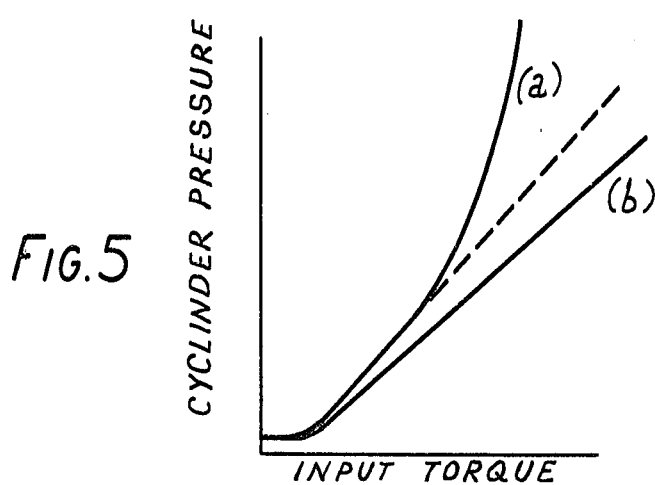

FIG. 3 illustrates perspective views of the moving parts of the device of FIGS. 1 and 2, FIG. 4(a) and FIG. 4(b) two different configurations for the slots to be referred to in a valve member of the device, and FIG. 5 graphically illustrates different pressure torque characteristics obtainable.

Referring to the device illustrated in FIGS. 1 and 2, it will be convenient to refer also to the perspective views of the movable components of the device in order to facilitate the understanding of the description. The device comprises an input torque member 1 in the form of a splined shaft and this is integral with a first valve member 2 of generally cylindrical form but which is provided with a pair of diametrically opposed slots 3 and 4 arranged parallel to the axis of the shaft. The valve member 2 is also provided with pairs of milled indentations as at 5 and 6 on either side of the slots 3 and 4. Additionally, the member 2 is provided with a central drilling which is arranged to carry suitable torque members in the form of leaf springs 7 and 8 for the purposes of centering the valve member 2 in relation to the second valve member which is denoted by reference 9. This valve member is also of generally cylindrical form and is internally milled to accept the valve member 2 and to locate between the valve member 2 and itself, cylindrical slugs 10 and 11 in slots 12 and 13 respectively. The slots 12 and 13 are arranged to be a substantially exact fit to precisely position the slugs 10 and 11 whereas the slots 3 and 4 of the first valve member are of elongated form such as to permit of movement of the member 2 in relation to the slots 12 and 13 by rotation of the input member 1. Additionally, the second valve member 9 is provided with diametrically opposed drillings 14 and 15 to provide fluid paths and also internally milled indentations such as is visible at 16 in FIG. 3, on either side and extending into the slots 12 and 13. It will be seen however that these indentations do not extend the full length of the cylindrical valve member 2. Further, the valve member 9 is provided with internal milled slots 17 and 18 to receive the ends of the springs 7 and 8 referred to above. The input torque member 1 is arranged to be rotatable in a main housing 19 of the valve device in seal 20 and the valve member 9 is arranged to be rotatable also within the main housing in bearings 21 and 22, the bearing 22 being retained by a sealed clamping ring 23, further annular seals as shown at 24 being provided on either side of an annular groove 25 provided internally of the main housing to provide a fluid flow communication from an input port 26. It will be noted that the drilling 14 and 15 communicate directly into the said annular groove 25. The device is further provided with an outlet port 27 and a port 28 communicating with the remote end of the steering gear housing. The other output port 27 communicates with a sealed annular region 31 extending around the input shaft. The second valve member 9 is shown as forming an end part of the ball screw of the recirculating ball screw steering mechanism the remainder of which is not shown. In operation of the arrangement it is convenient to refer especially to FIG. 2 which comprises a view through the section A—A of FIG. 1. Fluid under pressure is applied at the input port 26 from where it passes into the annular groove 25 and then divides into two paths. One path is through the radial passage mentioned above as reference 14, the recess 6, the restriction between the recess 6 and region 32 between the valve members and the clearance 33 between the cylindrical slug 10 and the groove 3 in the inner valve member. The fluid then passes outwards along the clearance in the groove 3 to the return flow 27. A similar flow path is provided via the further passage 14a into a corresponding recess in the inner valve member and a similar flow path via the clearance on the other side of the cylindrical slug 10. Again, similar flow paths are provided via radial passages on either side of the other cylindrical slug 11. Considering merely the flow path via the passage 14, the recess 6, the region 32 and the clearance between the groove 33 and the slug 10, in the event of a clockwise movement of the inner valve member 2 relative to the outer valve member 9, the restriction which exists between the recess 6 and the region 32 tends to open up whereas the clearance 33 tends to close thereby introducing an increased restriction for fluid flow. The effects on the continuation on the other side of the slug 10 in the flow path through the passage 14a, is a corresponding closure of the initially encountered restriction but a corresponding opening up of the clearance between the cylindrical slug 10 and the groove 3. The flow therefore tends to reduce through the path 14a but is biassed towards the path 14 and due to the increased restriction downstream of the passage 30, a pressure increase in the passage 30 occurs and this pressure is applied to one side of the power assistance mechanism for assisting the recirculatory ball screw steering mechanism. This pressure is transmitted via the output port 28. In the event of a reaction in the opposite direction being counteracted between the valve members 2 and 9, the opposite effect occurs and there is an increased pressure transmitted via the output port 28a which is shown dotted in FIG. 1 and in cross section FIG. 2. The flow path through the passages 15a and 15, operates in an identical fashion and the diametrically opposed output ports such as 30 and 30a are connected to contribute to the flow to the output port 28 or the output port 28a as the case may be.

By virtue of the provision of a relative shape of the inner valve member 2 in relation to the outer valve member 9, it is seen that restrictions such as that between the recess 6 and the region 32 are provided upstream of the output passages such as 30 and therefore a flow dividing effect is produced integrally with the valve members, the flow being equally divided through passages such as 14 and 14a in the centrally disposed condition of the arrangement but the flow being biased into the high pressure side in the event of a reaction being encountered. Additionally, similarly to the above-mentioned United Kingdom Patent, fluid reactions are set up between the slugs 10 and 11 and the respective flanks of the grooves 3 and 4 within which fluid pressure is established in the reacting condition.

The springs 7 and 8 are located in the afore-mentioned aperture in the valve member 2 the ends projecting and locating in the milled slots 17 and 18 in the valve member 9. The springs 7 and 8 thereby provide a centering reaction for the input shaft 1 in relation to the power assistance mechanism.

Referring to FIG. 4, as mentioned above, the cavities which are formed between the flanks of the groove 3 or the groove 4 and the respective cylindrical slug 10 or 11 positioned therein enable reactive torque to be set up and clearly the magnitude of this reactive torque determines the degree of effort or feel transmitted through the shaft 1 to the driver's steering wheel. The input torque is dependent moreover on the configurations of the pressurised cavities which exist between the cylindrical slugs 10 and 11 and the valve member 2. In FIG. 4a, the slot 3 has a profile which does not conform exactly with the cylindrical slug 10, so that as the cylindrical slug 10 approaches one flank of the slot 3, it leaves a substantially greater clearance in regions 46 and 47 than at 44 or 45. The proportion of the valve members are such that in the central portion the orifice area at 44 and 45 is greater than that at 46 and 47 (due to the length of the cylindrical slug and the blanking of one end of the slot 3 by the race of the thrust bearing). Thus for initial movements of the valve the pressure in the cavities 41 or 42 is controlled primarily by the clearances at 47 or 46 and this pressure reacts on the input shaft to produce a torque opposing the movement as indicated above. As the cylindrical slug 10 approaches closely the flank of the slot 3, the restriction in the region 45 or 44 also controls the pressure in cavities 41 or 42 without producing appreciable additional reaction on the walls of the slot 3. The result of this double restriction is to produce a valve characteristic of a power assistance cylinder pressure against input torque, of the form shown in FIG. 5a. This form of characteristic may be desirable for a steering mechanism, as maximum torque (for parking and manoeuvering of the vehicle) reduces while a substantially proportional input-/output relationship is maintained at lower efforts under normal driving conditions.

Referring to FIG. 4(b) this shows a form of the slot 3 having a partially cylindrical cross-section to conform with the surface of the cylindrical slug 10 but with different centers for the profiles of each flank. Recesses 48 and 49 are provided which do not break out axially at the ends of the valve member 2 to form passages in the flanks of the slot 3 open to fluid in the recesses 42 and 41 respectively. When the input shaft 1 is moved (say), in an anticlockwise direction, the inlet fluid from an adjacent recess 40 flows into recesses 41 and 49 and escapes from the ends of the slot 3. The pressure in recesses 41 and 49 is fed to one side of the power assistance piston via the passage 28a and also produces a reaction on the flank of the slot 3 over the "window" area. The pressure is dependent upon the proximity of the cylindrical slug 10 to the flank of the slot 3 and in this case the reaction is substantially proportional to the pressure applied to the power assistance cylinder. The characteristic is thus substantially of the form shown in FIG. 5(b). A similar effect occurs with clockwise movement of the shaft relative to the outer member with flow from the adjacent recess 51 into 42 and 48.

For the purposes of ensuring stable operation of the device and to avoid the necessity for fine tolerances in the machining of the various recesses in the valve members 2 and 9, the inlet recesses 41 and 40 should be preferably closed off from the overlapping recesses 42 and 41 prior to the cylindrical slug 10 closing off the outlet slots at 43 or 42 to an extent that high pressures are developed in the recesses 42 or 41. This conditon may also substantially ensure that maximum available flow is directed to the power assistance piston even at moderate output pressures.

It will be appreciated from the above discussions and with reference to FIGS. 4 and 5 that the invention can provide a construction of power assistance control device which allows for selection of the pressure against input torque characteristics, by suitable adjustment of the machining operations on the input valve member 2.

It will be appreciated moreover that in the event of failure of the fluid supply pressure due to a fractured connection or failure of the hydraulic supply pump, the arrangement can operate with direct force by direct contact of the cylindrical slugs 10 and 11 with the flanks of the slots 3 and 4. The provision moreover of a non-return valve 50 can ensure that the piston of the power assistance mechanism can be moved manually after power failure without emptying the cylinder behind the piston.

I claim:

1. A fluid power assistance control device including a rotatable force input member, a first valve member coupled to said force input member for rotation therewith, and a second valve member rotatable relative to said first valve member, one of said first and second valve members having at least one projection projecting into the other of said first and second valve members to limit the rotation between said first and second valve members, said projection cooperating with said first and second valve members to substantially define two fluid flow paths, said fluid flow paths communicating with an outlet port and said projection forming fluid flow restrictions within said fluid flow paths such that relative rotation between said first and second valve members increases the fluid flow restriction in one of said two fluid flow paths and decreases the fluid flow restriction in the other of said two fluid flow paths, said first and second valve members cooperating to substantially define reaction cavities which communicate with respective fluid flow paths such that fluid communicated to one of said reaction cavities opposes the rotation of said force input member.

2. A control device according to claim 1, wherein the first valve member is generally circular and has a pair of circumferential diametrically opposed slots arranged parallel to the axis of circularity, the second valve member is generally circularly cup-shaped and contains the first valve member for rotation coaxially therein and also has a pair of diametrically opposed slots arranged within the cup and parallel to the axis of circularity, the latter slots being aligned with the first said slots, and a pair of cylindrical slugs disposed within the respective slots to lie partly in each slot in each valve member, the slots being circumferentially wider than the slugs to provide flow paths, relative rotation between the valve members varying the relative sizes of the flow paths on either side of the slugs to vary said fluid flow restrictions.

3. A control device according to claim 2, wherein the flow paths are constituted by orifice areas in the first valve member and axially centrally disposed of the slugs, the ends of these areas being blanked by the second valve member.

4. A control device according to claim 2, wherein the flow paths are constituted by cut-out window areas in the first valve member and axially centrally disposed of the slugs.

5. A control device according to claim 2, wherein fluid flow paths to the slots include partly matingly disposed slots on opposing surfaces of the first and second valve members.

6. A control device according to claim 2, including spring means centering the first valve member relative to the second valve member.

7. A control device according to claim 6, wherein the spring means comprise leaf springs arranged within mutually coaxial central drillings in the first and second valve members and disposed to provide torsional centering forces in use.

* * * * *